United States Patent
Kumar et al.

(10) Patent No.: US 8,457,258 B2
(45) Date of Patent: Jun. 4, 2013

(54) OPTIMAL TRAINING SEQUENCE AND CHANNEL ESTIMATION METHOD AND SYSTEM FOR SUPERIMPOSED TRAINING BASED OFDM SYSTEMS

(75) Inventors: Ratnam Varada Raja Kumar, Kharagpur (IN); Jinesh Parameshwaran Nair, Kharagpur (IN)

(73) Assignee: Indian Institute of Technology, Kharagpur, West Bengal (IN)

( * ) Notice: Subject to any disclaimer, the term of this patent is extended or adjusted under 35 U.S.C. 154(b) by 242 days.

(21) Appl. No.: 12/919,419

(22) PCT Filed: Sep. 3, 2008

(86) PCT No.: PCT/IN2008/000558
§ 371 (c)(1),
(2), (4) Date: Aug. 25, 2010

(87) PCT Pub. No.: WO2009/107146
PCT Pub. Date: Sep. 3, 2009

(65) Prior Publication Data
US 2011/0007829 A1 Jan. 13, 2011

(30) Foreign Application Priority Data
Feb. 25, 2008 (IN) .............................. 333/KOL/2008

(51) Int. Cl.
*H04L 27/06* (2006.01)
(52) U.S. Cl.
USPC ........... 375/343; 375/229; 375/230; 375/232; 375/260; 375/340; 370/210; 370/344; 370/480; 341/173; 341/180
(58) Field of Classification Search
USPC .. 375/229, 230, 232, 260, 340, 343; 370/210, 370/344, 480; 341/173, 180
See application file for complete search history.

(56) References Cited

U.S. PATENT DOCUMENTS

| | | |
|---|---|---|
| 6,990,153 B1 * | 1/2006 | Farhang-Boroujeni et al. .............................. 375/260 |
| 2006/0203932 A1 * | 9/2006 | Palanki et al. ................. 375/295 |

OTHER PUBLICATIONS

Jinjing Zhan et al: "Channel estimation for OFDM systems based on RLS and superimposed training sequences", Proceedings of the IEEE International Conference on Wireless Communications, Networking and Mobile Computing, Sep. 21, 2007, pp. 37-40, XP031261191, ISBN: 978-1-4244-1311-9.

(Continued)

*Primary Examiner* — Leon Flores
(74) *Attorney, Agent, or Firm* — Holland & Hart LLP (57) ABSTRACT

The present invention relates to a method for minimizing means square estimation error (MSEE) and bit error rate during channel estimation and equalization between a transmitter and a receiver of an orthogonal frequency division multiplexing (OFDM) systems. The method comprises transmitting from said transmitter to said receiver a training sequence for channel estimation being superimposed onto data at specific pilot to data power ratio (PDPR), receiving the OFDM signals along with the training sequence as an input, cross-correlating said received signal to a specific lag determined by the rms delay spread of the channel, with a specific known training sequence stored in a register, and which is also the sequence that is added to the data at the transmitter in the time domain having a prescribed pilot to data power ratio. The cross-correlated data being processed over a length of samples which can be extended to exploit the coherence time of the channel and processed along with the stored values of the inverse of autocorrelation values of superimposed training (ST) sequence so as to obtain a reliable least squares based channel estimate in a way the PDPR is limited or otherwise. The invention also relates to a system comprising means for computing a time domain least squares (LS) based channel estimate at the receiver.

11 Claims, 5 Drawing Sheets

OTHER PUBLICATIONS

Qinghai Yang et al: "Superimposed training for estimating of doubly-selective OFDM channels", Proceedings of the IEEE International Conference on Advanced Communication Technology, Feb. 1, 2007, pp. 1652-1655, XP031085072, ISBN: 978-89-5519-131-8.

Yang Q et al: "Superimposed-pilot-aided channel estimation for mobile OFDM", IEE Electronics Letters, vol. 42, No. 12, Jun. 8, 2006, pp. 722-724, XP006026830, ISSN: 0013-5194.

Yang, Q. and Kwak, K.S.: "Optimal superimposed training for estimation of OFDM channels", AEU—International Journal of Electronics and Communications, Nov. 9, 2007, XP002512885, published online on Nov. 9, 2007, also available as a hard copy in vol. 62, issue 10, retrieved from the Internet at http://www.sciencedirect.com/science?_ob=ArticleURL&_udi=B7GWW-4R3BWH7-1&_user=987766&_rdoc=1&_fmt=&_orig=search&_sort=d&view=c&_acct=C000049880&_version=1&_urlVersion=0&_userid=987766&md5=0cf5453f4e2db1fc02e7c6dbf9ce8b94>.

International Searching Authority "Notification of Transmittal of the International Search Report and the Written Opinion of the International Searching Authority, or the Declaration" Feb. 18, 2009.

Hoeher, Peter and Tufvesson, Fredrik. "Channel Estimation with Superimposed Pilot Sequence", Proceedings of the IEEE-GLOBECOM, Dec. 1999, vol. 4, pp. 2162-2166.

Mazzenga, Franco. "Channel Estimation and Equalization for M-QAM Transmission with a Hidden Pilot Sequence", IEEE Transactions on Broadcasting, Jun. 2000, vol. 46, No. 2, pp. 170-176.

Kastenholz, C.E. and Birkemeier, W.P. "A Simultaneous Information Transfer and Channel-Sounding Modulation Technique for Wide-Band Channels", IEEE Transactions on Communication Technology, Jun. 1965, vol. 13, No. 2, pp. 162-165.

Orozco-Lugo, Aldo G.; Lara, M. Mauricio; and McLernon, Des C. "Channel Estimation Using Implicit Training", IEEE Transactions on Signal Processing, Jan. 2004, vol. 52, No. 1, pp. 240-254.

Chen, Ning and Zhou, G. Tong. "Superimposed Training for OFDM: A Peak-to-Average Power Ratio Analysis", IEEE Transactions on Signal Processing, Jun. 2006, vol. 54, No. 6, pp. 1-10.

Ohkubo, Naoto and Ohtsuki, Tomoaki. "Added Pilot Semi-Blind Iterative Channel Estimation for OFDM Packet Transmission", Proceedings of the IEEE-GLOBECOM, Dec. 2003, vol. 2, No. 2, pp. 878-882.

Yang, Qinghai and Kwak, Kyung Sup. "Time-Varying Multipath Channel Estimation with Superimposed Training in CP-OFDM Systems", ETRI Journal, Dec. 2006, vol. 28, No. 6, pp. 822-825.

Cui, Tao and Tellambura, Chintha. "Superimposed Pilot Symbols for Channel Estimation in OFDM Systems", Proceedings of the IEEE-GLOBECOM, Dec. 2005, pp. 2229-2233, Missouri, USA.

Ho, C. K.; Farhang-Boroujeny, B.; and Chin, F. "Added Pilot Semi-Blind Channel Estimation Scheme for OFDM in Fading Channels", Proceedings of the IEEE-GLOBECOM, Nov. 2001, pp. 3075-3079, Texas, USA.

Zhu, Haidong; Farhang-Boroujeny, Behrouz; and Schlegel, Christian. "Pilot Embedding for Joint Channel Estimation and Data Detection in MIMO Communication Systems", IEEE Communications Letters, Jan. 2003, vol. 7, No. 1, pp. 30-32.

Balasubramanian, Shankar; Farhang-Boroujeny, Behrouz; and Mathews, V. John. "Pilot Embedding for Channel Estimation and Tracking in OFDM Systems", Proceedings of the IEEE-GLOBECOM, Nov. 2004, pp. 1244-1248, Dallas, USA.

* cited by examiner

OPTIMAL TRAINING SEQUENCE AND CHANNEL ESTIMATION METHOD AND SYSTEM FOR SUPERIMPOSED TRAINING BASED OFDM SYSTEMS

TECHNICAL FIELD OF THE INVENTION

The present invention relates to channel estimation and equalization in multicarrier as well as single carrier communication systems. More particularly, the invention relates to a method and system for jointly minimizing mean square estimation error (MSEE) as well as the bit error rate (BER) during channel estimation and equalization in superimposed training based orthogonal frequency division multiplexing (OFDM) systems.

BACKGROUND AND THE PRIOR ART

Orthogonal frequency division multiplexing (OFDM) is a multi-carrier communication scheme in which, data at a high rate is divided into sub-streams and transmitted over orthogonal carriers, thus enabling data transmission over a frequency selective fading channel, in a bandwidth efficient manner.

Channel estimation is an important constituent of coherent OFDM receivers. Guard intervals are inserted between adjacent OFDM block symbols, to take care of Inter Block Interference (IBI). Transmitting a Cyclic Prefix (CP) of the data during this interval makes the channel circularly convolutive, simplifying the channel equalization problem. Specifically, channel equalization in the frequency domain can be done using one tap filters. This is because the CP makes the channel matrix circulant, which is diagonalized by the inverse discrete Fourier transform (IDFT) and DFT operations. The challenge in frequency domain channel equalization lies in estimating the channel frequency coefficients at all the subcarriers.

In conventional OFDM systems, channel estimation is done using pilot tones along with data. In slow fading environments, channel estimation can be done by inserting pilot tones into all of the subcarriers of the OFDM symbol with a specific period during which the channel is assumed to be quasi-static. In fast fading environments pilot tones are inserted at specific subcarriers in each OFDM symbol. The channel frequency coefficients at the data tones are then determined by interpolation based approximations resulting in channel estimation errors, which could be significant in a frequency selective fading channel. Also, pilot tone insertion reduces the bandwidth efficiency of the system. The need for higher data rates and mobility only aggravates the problem. This motivates the need for blind estimators which exploits the statistics of the transmitted data, or some redundancy in the transmitted data to estimate the channel without employing pilots. Traditionally blind estimators have been found to have a slow convergence time and also there is a possibility of convergence of the performance surface to a local minimum. Semi-blind equalization allows for a trade-off between performance and bandwidth efficiency by making use of blind as well as pilot assisted techniques.

"Channel estimation with superimposed pilot sequence," Proceedings of the IEEE-GLOBECOM, vol. 4, pp. 2162-2166, December 1999, by Hoeher P and Tufvesson F, discloses a superimposed pilot training sequence technique for the purpose of channel estimation in a coherent receiver based on the Viterbi algorithm for single carrier systems.

"Channel estimation and equalization for M-QAM Transmission with a hidden pilot sequence," IEEE Transactions on Broadcasting, vol. 48, no. 2, pp. 170-176, June 2000 by F. Mazzenga discloses a method for estimating the channel by preserving the bandwidth efficiency at the expense of increasing the transmitted power and using a known pilot sequence hidden into the informative sequence.

"A Simultaneous Information Transfer and Channel-Sounding Modulation Technique for Wide-Band Channels," IEEE Transactions on Communications, June 1965, vol 13 no: 2, pp-162-165, by Kastenholz and Birkmeier, discloses a method of superimposing a pseudorandom channel sounding signal by amplitude modulation upon a conventional FM information-bearing signal.

"Channel estimation using implicit training," IEEE Transactions on Signal Processing, vol. 52, no. 1, January 2004 by A. G. Orozco-Lugo, M. Lara, D. Mc Lernon discloses a new method to perform channel estimation. It is shown that accurate estimation can be obtained when a training sequence is actually arithmetically added to the information data as opposed to being placed in a separate empty time slot.

The article "Superimposed Training for OFDM: a peak-to-average power ratio analysis," IEEE Transactions on Signal Processing, vol. 54, no. 6, pp. 2277-2287, June 2006 by N. Chen and G. T. Zhou describes an orthogonal frequency division multiplexing (OFDM) transmission with superimposed training. The PAR of the OFDM signal is examined with superimposed training, and its complementary cumulative distribution function (CCDF) is derived. Achievable lower and upper bounds on the CCDF are also determined. In addition, the PAR change is linked to the effective signal-to-noise ratio (SNR) and thus the bit-error-rate (BER) performance under the fixed dc power constraint.

The article Proceedings of the IEEE-GLOBECOM, vol. 2, no. 2, pp. 878-882, December 2003 by N. Ohkubo and T. Ohtsuki teaches added pilot semi-blind channel estimation for OFDM packet transmission.

ETRI Journal, vol. 28, no. 5, pp. 688-691, October 2006 by Q. Yang and K. S. Kwak teaches "Time-varying multipath channel estimation with superimposed training in CP-OFDM systems". A time-domain channel estimation scheme for time-varying multipath channels is developed by using superimposed sequences. The idea behind this scheme is to split the one-OFDM-symbol-period time-domain channel into equi-spaced time-slotted sub channels, so that the time variation for each sub channel can be assumed to be negligible; then, each sub channel is estimated by a linear least square (LS) estimator.

The article Proceedings of the IEEE-GLOBECOM, Missouri, USA, December 2005, pp. 2229-2233T by Cui and C. Tellambura discloses "Superimposed pilot symbols for channel estimation in OFDM systems". Article Proceedings of the IEEE-GLOBECOM, Texas, USA, November 2001, 3075-3079 by C. K. Ho, B. Farhang-Boroujeny and F. Chin discloses "Added pilot semi-blind channel estimation scheme for OFDM in fading channels". Article IEEE Communications Letters, vol. 7, no. 1, pp. 30-32, January 2003 by H. Zhu, B. Farhang-Boroujeny and C. Schlegel teaches "Pilot embedding for joint channel estimation and data detection in MIMO communication systems". Further the article Proceedings of the IEEE-GLOBECOM, Dallas, USA, November 2004, pp. 1244-1248 by S. Balasubramanian, B. Farhang-Boroujeny and V. John Mathews describes "Pilot embedding for channel estimation and tracking in OFDM systems".

There is a need for bandwidth efficient channel estimation techniques for OFDM with good performance. Recently, superimposed training (ST) based channel estimation techniques have been proposed. In this scheme, training symbols known to the receiver are algebraically added on to the data at a low power, thus avoiding the need for additional time slots for training. At the receiver these known symbols, in the presence of unknown data and noise, are exploited for channel estimation. These methods for channel estimation are attractive compared to pilot assisted techniques as they are bandwidth efficient. ST based methods for channel estimation in OFDM have been considered in the literature for use in present and future generation cellular including 4G, the focus being on iterative source channel estimation techniques, the optimality criteria for the training sequences and peak to average power (PAPR) analysis.

The state of the art however, leaves many critical issues unanswered. Iterative channel estimation techniques to get improved accuracy and also to further reduce the interference of the data on the estimate are used. However the LS channel estimate used does not exploit the nature of the frequency selective block fading channel that occurs in practice. The ST sequence used for channel estimation plays a pivotal role in system performance. The cost function that is used to characterize the optimal training sequences is the minimization of the mean square estimation error (MSEE) or the Cramer-Rao lower bound (CRLB). These are also the optimization criteria generally used for pilot assisted techniques which are reasonable because in this case the training is separated from the data. However, in the superimposed training scheme both of these criteria result in characterizations that does not take into account the interference of the training sequences on the data detection. Moreover the training sequences used in the existing art will not be applicable in currently standardized wireless OFDM systems because of the existence of frequency components at the band edges which are generally used in the brick wall shaping of the transmit spectrum. It was not known in the prior art of using superimposed training that the number of OFDM symbols experiencing the same channel may be used to improve the channel estimation accuracy by averaging over several symbols depending on the coherence time of the channel and/or the desired estimation accuracy. Hence the number of OFDM symbols averaged to estimate the channel impulse response making it suitable to the characteristics of the channel encountered in different standards by the superimposed training based OFDM system was not in the prior art.

Thus there is a need to provide for a system and method for jointly minimizing the mean square estimation error (MSEE) and bit error rate (BER) during channel estimation and equalization in orthogonal frequency division multiplexing (OFDM) systems.

Thus in a quest for obtaining an optimal equalizer, the present inventors have got a new idea and found that channel MSEE and the BER can be jointly minimized thereby arrived at a digitized linear frequency modulation (LFM) based optimal training sequence that fairly distributes the interference due to the training on the data on all the used sub-carriers for superimposed training based OFDM systems and further introduced averaging of the channel estimates beyond one OFDM symbol so as to obtain an improved channel estimation from OFDM symbols experiencing the same fading coefficients. This improves channel estimation in OFDM systems without using additional bandwidth for the purpose of channel estimation and equalization.

OBJECTS OF THE INVENTION

Accordingly one object of the present invention is to address the shortcomings/disadvantages of the prior art and arrive at a new and advantageous scheme.

Another object of the present invention is to provide a system for minimizing means square estimation error (MSEE) and bit error rate (BER) during channel estimation and equalization in superimposed training based orthogonal frequency division multiplexing (OFDM) systems without using additional bandwidth for the purpose of channel estimation and equalization.

Another object of the present invention is to provide a method for minimizing means square estimation error (MSEE) and bit error rate (BER) jointly during channel estimation and equalization in superimposed training based orthogonal frequency division multiplexing (OFDM) systems.

SUMMARY OF THE INVENTION

Thus according to one aspect of the present invention there is provided a method for minimizing means square estimation error (MSEE) and bit error rate during channel estimation and equalization between a transmitter and a receiver of an orthogonal frequency division multiplexing (OFDM) systems, said method comprising steps of:

transmitting from said transmitter to said receiver a training sequence for channel estimation being superimposed onto data at specific pilot to data power ratio (PDPR);

receiving the OFDM signals along with the training sequence as an input, wherein said received signal simultaneously contains training and data signals at said receiver;

cross-correlating said received signal to a specific lag determined by the rms delay spread of the channel, with a specific known training sequence stored in a register, and which is also the sequence that is added to the data at the transmitter in the time domain having a prescribed pilot to data power ratio, wherein the said cross-correlated data being processed over a length of samples which can be extended to exploit the coherence time of the channel and processed along with the stored values of the inverse of autocorrelation values of superimposed training (ST) sequence so as to obtain a reliable least squares based channel estimate in a way the PDPR is limited or otherwise.

According to another aspect of the present invention there is provided a system for minimizing means square estimation error (MSEE) and bit error rate (BER) jointly during channel estimation and equalization of an OFDM based communication system, said system for minimizing MSEE and BER comprising:

means for transmitting from said transmitter to said receiver a training sequence for channel estimation that is superimposed onto the data at a specific pilot to data power ratio (PDPR);

receiver means for receiving said signal simultaneously containing training and data signals at the said receiver; and means for computing a time domain least squares (LS) based channel estimate at the receiver.

wherein the said receiver means comprises means for cross-correlating said received OFDM signal to a specific lag determined by the rms delay spread of the channel, with a specific known training sequence stored in the receiver means, and which is also the sequence that is added to the data at the transmitter in the time domain having a prescribed pilot to data power ratio, wherein the correlated data being averaged over a length of samples which may exploit the coherence time of the channel and processed along with the stored values of the inverse of autocorrelation values of superimposed training (ST) sequence so as to obtain a reliable least squares based channel estimate in a way the PDPR is limited or otherwise.

Further, the embodiment comprises of an interference canceller to reduce the effect of the superimposed training sequences on the data, which multiplies the DFT of the specific training sequence with the frequency coefficients of the channel estimate and subtracts these signals from the DFT of the received signals.

Another very important characteristic of the invention is the use of a training sequence for the above channel estimation method that is stored in a register in the channel estimator module in the receiver, and which is also the sequence that is added to the data at the transmitter, that are samples of a digitized linear frequency modulated (LFM) signal having uniform energy components in all the subcarriers of the OFDM symbol, which are shaped by the virtual subcarriers according to specifications of the standard to which the OFDM based system complies. This sequence is optimal in terms of jointly minimizing the bit error rate (BER) of the OFDM system in addition to minimizing the MSEE. Approximations of the LFM including quantized or perturbed versions may be used with an associated loss in performance.

The other objects and advantages of the present invention will be apparent from the description provided hereinbelow with reference to the accompanying figures and detailed description provided herein below.

DETAILED DESCRIPTION OF THE INVENTION

Figure 1:
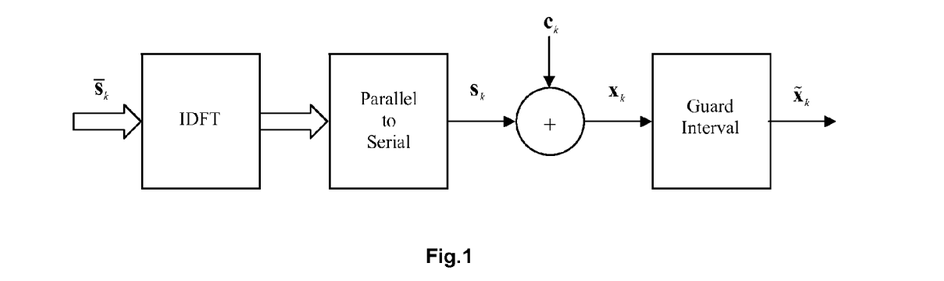
FIG. 1 illustrates a block diagram of the equivalent baseband transmitter of the superimposed training based OFDM system.

FIG. 1 is the block diagram of the transmitter of a superimposed training based OFDM system. Although not necessary, perfect synchronization is assumed here for illustration. Binary data is grouped into symbols depending on the level of QAM modulation used. Vectors $\bar{s}_k$ of such symbols are formed which are then passed to the IDFT block. Here k stands for the OFDM symbol index. Some of the entries are zeros to serve the spectral mask requirements of the OFDM system. The output of the IDFT block is $s_k = F^H \bar{s}_k$, where F is the normalized N×N DFT matrix with $F(m,n) = 1/\sqrt{N} e^{-j2\pi mn/N}$ and $F^H$ is the complex conjugate transpose. Here (m,n) is used to denote the mth row and nth column of the matrix. A parallel to serial converter serially outputs the simultaneous IDFT outputs. A training sequence $c_k$ is then algebraically added to this IDFT output with a specific low pilot to data power ratio to get, $$x_k = s_k + c_k \tag{1}$$

A characteristic of the invention is the training sequence that is added to the data. These are samples of a digitized linear frequency modulated (LFM) signal. The LFM sequence occupies all the sub-bands of the OFDM system with equipowered components for optimum performance in terms of fairness and residual interference in data detection.

$$c_k(m) = e^{j\frac{2\pi m}{N}\left(\frac{m}{2}+1\right)} \tag{2}$$

Here m denotes the mth row of the vector. The sequence is generalized to incorporate the guard bands that are specified in many of the currently standardized OFDM based systems. In this case the training sequence is given by, $$c_k(m) = IDFT_N\left\{DFT_N\left[e^{j\frac{2\pi m}{N}\left(\frac{m}{2}+1\right)}\right] \times W(k)\right\} \tag{3}$$

Here W(k) is the frequency domain window function used to satisfy the spectral mask requirements of the OFDM based system, if any. Here W(k) can be any spectral mask including a rectangular function defined for $0 \leq k \leq N-1$. The $DFT_N[x(n)]$ and $IDFT_N[X(k)]$ are defined as, $$DFT_N[x(n)] = X(k) = \sum_{n=0}^{N-1} x(n) e^{-j\left(\frac{2\pi nk}{N}\right)}, k = 0, 1, \ldots N-1 \tag{4a}$$

$$IDFT_N[X(k)] = x(n) = \frac{1}{N}\sum_{k=0}^{N-1} X(k) e^{j\left(\frac{2\pi nk}{N}\right)}, n = 0, 1, \ldots N-1 \tag{4b}$$

These sequences are found to be optimal in terms of jointly minimizing the MSEE and also the BER. Prior art doesn't suggest the training sequences that are optimal in terms of minimizing the BER. Neither the sequences suggested in the literature yield optimum performance. Also this method can be efficiently incorporated into currently standardized systems unlike the state of the art vis-à-vis the occupancy of training sequence components in the guard sub-bands. Also this sequence has better correlation properties compared to the PN sequences, which are commonly used for channel sounding. Approximations of the LFM including quantized and perturbed versions may be used with an associated loss in performance.

A cyclic prefix (CP) is inserted in the guard intervals between adjacent IDFT blocks to obtain $\tilde{x}_k$. This prevents Inter Block Interference (IBI) between adjacent IDFT outputs, and also simplifies the channel equalization in the frequency domain at the receiver, if the delay spread of the channel is lesser than the guard interval.

Figure 2:
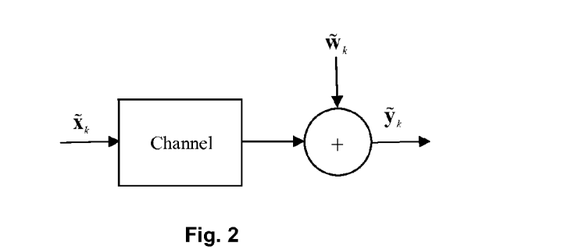
FIG. 2 illustrates a block diagram of the equivalent baseband channel encountered in a typical superimposed training based OFDM system.

The present system involving transmission of OFDM symbols have the capacity to work when transmitted over time-varying frequency selective fading channels. These channels are characterized by a set of impulse response coefficients, which remain nearly constant for the duration of the quasi-static fading interval, which typically extends over several OFDM symbols for normally encountered vehicular speeds. This frequency selective fading channel and the white Gaussian noise (AWGN) added at the receiver front end constitutes the overall channel experienced by the OFDM symbols from the transmitter to the receiver as shown in FIG. 2. Such channels are encountered in many of the wireless communication systems in use today and systems which are going to be used in future.

Figure 3:
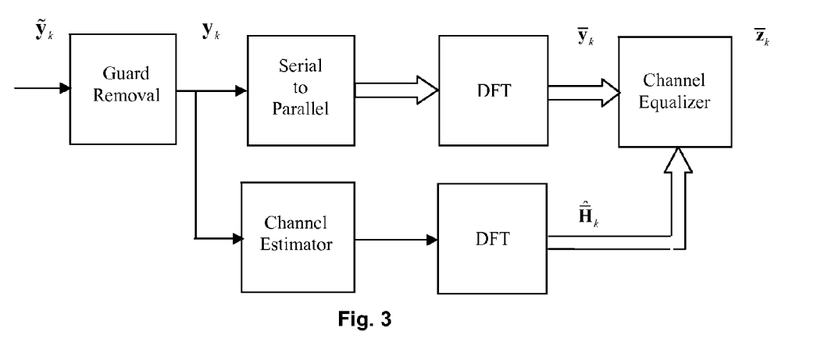
FIG. 3 illustrates a block diagram of the equivalent baseband receiver of the superimposed training based OFDM system.

FIG. 3 shows the receiver of the superimposed training based OFDM system. The received vectors obtained after guard removal from the OFDM symbols may be expressed as $$y_k = H_k(s_k + c_k) + w_k \quad (5)$$

Here $w_k$ is the AWGN associated with the $k^{th}$ vector and $H_k$ is the channel Toeplitz matrix with dimensions N×N. The block fading nature of the channel allows us to assume that the channel is nearly the same for many OFDM symbols. Hence $H_k \approx H$, $k=0, 1, \ldots T_p-1$, where $T_p$ depends on the channel coherence time. Equation 3 can also be written as, $$y_k = (S_k + C_k)h_k + w_k \quad (6)$$

Here $S_k$ and $C_k$ are Toeplitz matrices of the data and training respectively having dimensions N×L and $h_k \approx h$, $k=0, 1, \ldots T_p-1$ is the L×1 length channel vector.

An embodiment of the invention is the channel estimation method. A time domain channel estimation is carried out based on a least squares (LS) criterion by correlating the stored training sequence with the received symbols and using the autocorrelation of the training sequence. An estimate of the channel h is given by, $$\hat{h} = \left(\sum_{k=0}^{T_p-1} C_k^H C_k\right)^{-1} \left(\sum_{k=0}^{T_p-1} C_k^H y_k\right) \quad (7)$$

The order of the estimator is R≧L and L is replaced by R in the dimensions of h and $C_k$. The order of the estimator depends on the delay spread of the channel. Here the summation is considered for the LS estimate over $T_p$ number of OFDM symbols to consider generalization of the LS estimate to extend the same to coherently integrate over $T_p$ symbols. Also R<<N, i.e. the channel delay spread is generally very low compared to the number of subcarriers. In this way the method is generalized to provide scope for exploiting the coherence bandwidth and the coherence time of the channel by averaging. This averaging process gives further flexibility in designing the system allowing an appropriate and acceptable power level for the sequence to suit practical implementation. For fast varying channels the averaging time can be reduced and the same may be compensated by adjusting the PDPR to suit the requirements.

Prior art does not exploit the quasi-stationary channel to obtain improved estimates of the channel. Also prior art makes use of computationally intensive 2D Wiener filtering to obtain the frequency coefficients of the channel at all the subcarriers. These methods require prior knowledge of the channel correlation functions at the receiver. In our case the N point DFT of the sequence performs a time domain interpolation to obtain the frequency coefficients of the channel at all the subcarriers. This method is of reduced complexity and also has negligible performance degradation compared to the Wiener interpolator. The proposed channel estimation method and the training sequences may be incorporated in the iterative source channel estimation techniques proposed in the literature in a straightforward manner in which case an improved performance is obtained at the cost of increased computational complexity and system latency.

Also the proposed channel estimation method and the proposed training sequence is applicable to single carrier systems in which case N represents the block length instead of the number of subcarriers and also, N≧R and $NT_p$ spans the number of symbols within the coherence time of the channel. As a special case, when N=R and $T_p=1$, the proposed estimator reduces to that proposed in the literature in which case, the performance is inferior as the coherence time of the estimator is not exploited.

Figure 4:
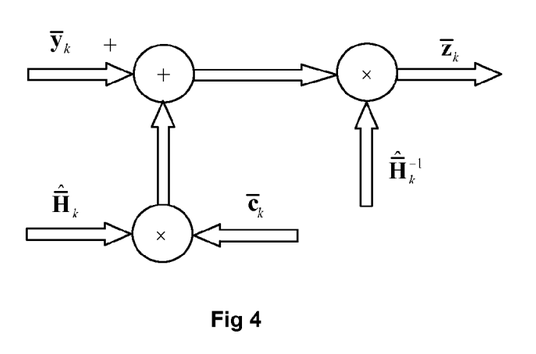
FIG. 4 illustrates a representation of the channel equalizer and canceling of interference due to the training sequence used in the receiver of the superimposed training based OFDM system.

The received vectors are input to the DFT block for demodulation and the frequency domain received vector $\bar{y}_k = Fy_k$ is obtained. Another characteristic of the invention is the method of canceling the interference of the superimposed training sequences on the data. FIG. 4 in conjunction with FIG. 3 illustrates the method. The N point DFT of the channel estimate $\hat{h}_k$ is computed and multiplied with the N point DFT of the training sequence $\bar{c}_k = Fc_k$ which is stored at the receiver. These are then subtracted from $\bar{y}_k$ to reduce the effect of the training on the data.

A one tap equalizer is then employed to reverse the effects of the channel on the received data. The interference cancelled and equalized output is given by, $$\bar{z}_k = \bar{s}_k \bar{\hat{H}}^{-1}(\bar{H} - \bar{\hat{H}})(\bar{s}_k + \bar{c}_k) + \bar{\hat{H}}^{-1} w_k \quad (8)$$

Here $\bar{H}$ and $\bar{\hat{H}}$ are diagonal matrices with diagonal entries being the frequency coefficients of the channel and its estimate respectively. These are then presented to the other blocks of a typical communication receiver like the detector, channel decoder etc for further processing.

Figure 5:
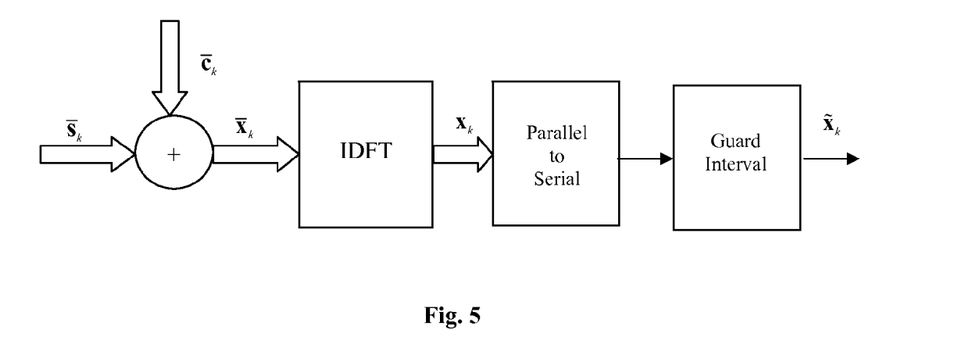
FIG. 5 illustrates an alternative representation of the transmitter as in FIG. 1, wherein the DFT of the training sequence is added to the data in the frequency domain at a particular pilot to data power ratio.
Figure 6:
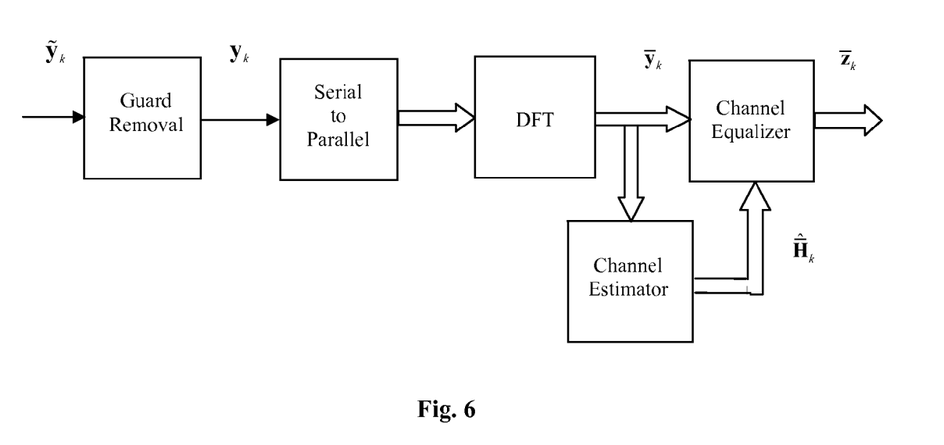
FIG. 6 illustrates an alternative representation of the receiver as in FIG. 3, wherein the frequency domain equivalent of the time domain channel estimation method is carried out.

FIG. 5 and FIG. 6 shows equivalent baseband transmitter and receiver respectively, with the equivalent frequency domain representations of the time domain superimposed training sequence at the transmitter as shown in FIG. 1 and the time domain channel estimation method at the receiver as shown in FIG. 3. As these methods are straightforward, they are not elaborated here for brevity.

Optimality of the Proposed Training Sequences

The proposed LFM sequence occupies all the used sub-bands of the OFDM system with equipowered components for optimum performance in terms of fairness and residual interference of the training sequence in data detection.

This condition, that is the optimality of the training sequences, is obtained by first finding a closed form expression for the mean squared estimation error (MSEE) in the channel estimate.

This MSEE is minimized under a fixed power constraint on the training sequence and the condition on the training sequence to minimize the MSEE is found. Then, of all sequences that satisfy this condition sequences that minimize the BER of the OFDM system are found.

This is done by finding the expression of the BER of the OFDM system on each subcarrier. The BER of the OFDM system then, is the mean of the BER of all the used subcarriers if the modulation format on each subcarrier is the same. The BER is found to be affected by the residual interference of the training symbols on the data. It is also seen that the BER of the OFDM system is dominated by the worst case BER of the subcarriers. As a result, under a power constraint on the training sequences, it is reasoned that the BER of the OFDM system is minimized by fairly distributing the residual interference on all the used subcarriers.

Hence the proposed training sequence is optimal in terms of jointly minimizing the MSEE and the BER of the OFDM system.

Case for WiMaX (IEEE 802.16e OFDM Mode) and Possibly the 4G Cellular Such as IEEE 802.16m Systems A recent application of interest that employs OFDM is the IEEE 802.16e for broadband wireless access. The proposed method and the training sequences may be directly incorporated into such WiMaX systems in the OFDM mode. Instead of transmitting 8 pilot symbols in each OFDM symbol, data is allowed to be transmitted in all the used subcarriers (200 subcarriers out of 256 subcarriers) thus improving the bandwidth efficiency of the system. In this case the channel estimator is as described above and the training sequence as a special case for this standard is, $$c_k(m) = IDFT_{256}\{DFT_{256}[e^{j\frac{2\pi m}{256}(\frac{m}{2}+1)}] \times W(k)\} \quad (9)$$

$$W(k) = \begin{cases} 0 & k = -128, -127, \ldots, -101, 0, 101, \ldots, 127 \\ 1 & k = -100, \ldots, -1, 1, \ldots, 100 \end{cases}$$

Figure 7:
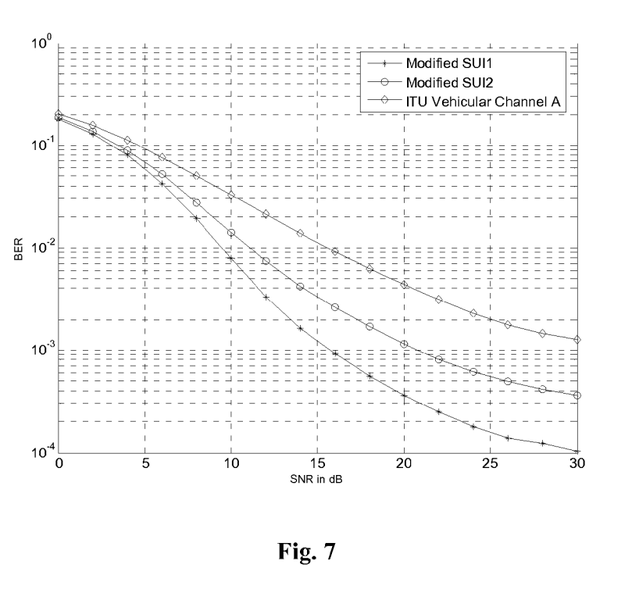
FIG. 7. illustrates BER vs. SNR graph for the Modified SUI1, SUI2 and ITU Vehicular Channel Model A with the simulation parameters of Table. 1, using the training sequence $c_k(m)$. A CP length of 8 samples were used for the Modified SUI1 and SUI2 channels and a CP length of 16 samples were used for the ITU Vehicular Channel A was used.

The results for this case are described in testing section 1, along with FIG. 7.

In this way the proposed method, system and training sequences may be incorporated into most of the emerging standards like the IEEE 802.16x including IEEE 802.16e and IEEE 802.16m, 3 GPP LTE etc and thus for the future 4 G cellular communication systems.

Advantages:

1) The proposed digitized LFM sequence jointly minimizes the channel MSEE and the BER of the OFDM system unlike the prior art which minimizes the MSEE of the channel only leading to the proposition of training sequences that result in better BER performance than the prior art.

2) The channel estimation accuracy is further improved due to the averaging of the channel estimate over the duration of the quasi-stationary channel encountered by the system compliant to a standard with out extending the unfairness in the interference to that duration. This averaging process gives further flexibility in designing the system allowing an appropriate and acceptable power level for the sequence to suit practical implementation.

3) Also the estimator is of reduced complexity due to the time domain interpolation of the channel estimate to obtain the frequency coefficients of the channel on all the used subcarriers.

Testing:

1) Performance over Mobile WiMaX channels: The performance of the proposed channel estimation scheme with the proposed optimal superimposed training sequence $c_k(m)$ as in (9) is shown in FIG. 7 over channels typically encountered in the Mobile WiMaX environments. The ITU Vehicular Channel A is used and also the Stanford University Interim (SUI) channels. The SUI channels are typically specified for fixed broadband wireless access, but these channels are modified to incorporate mobility by replacing the Doppler filter in the specifications. A mobility of 90 km/hr leads to a coherence time of approximately 0.7 ms, resulting in around 8 OFDM symbols experiencing nearly the same fading coefficients when the carrier frequency is 3 GHz. The data takes the format of the IEEE 802.16e-2005, Wireless MAN OFDM PHY layer standard. The only difference is that instead of using the 8 pilots allocated at certain subcarriers, the data is allowed to be transmitted at all the useful subcarriers. Symbol spaced channel coefficients were generated from the multipath spaced channel coefficients using an FIR interpolation with a Gaussian function whose variance was normalized by the rms delay spread of the channel. The sample spaced power delay profile is $$P(n) = \sum_{i=0}^{K} P_i e^{-\frac{(n-\tau_i f_s)^2}{2\sigma_x^2}}, n = 0, 1 \ldots Q-1 \quad (10)$$

Here, $P_i$ and $\tau_i$ are the power and the delay respectively, associated with the ith path, $\sigma_x = \sigma_{rms} f_s/10$, where $\sigma_{rms}$ is the rms delay spread of the channel.

Table 1 gives simulation parameters used for the channels Modified SUI-1, Modified SUI-2 and ITU Vehicular Channel A with rms delay spreads 0.0903 µs, 0.1032 µs and 0.364 µs respectively. It is seen FIG. 7 that as the rms delay spread of the channel increases, the BER keeps increasing.

TABLE 1

| Symbol | Simulation Parameters | Values |
| --- | --- | --- |
| $f_c$ | Center frequency | 3 GHz |
| BW | Channel Bandwidth | 5 MHz |
| $f_s$ | Signal sampling rate | 5.76 MHz |
| $f_{d\,max}$ | Maximum Doppler frequency | 250 Hz |
| CP | Cyclic Prefix | 8, 16 samples |
| Q | Order of the estimator | 8 samples |
| $T_p$ | Number of OFDM symbols used for channel estimation | 8 symbols |

Figure 8:
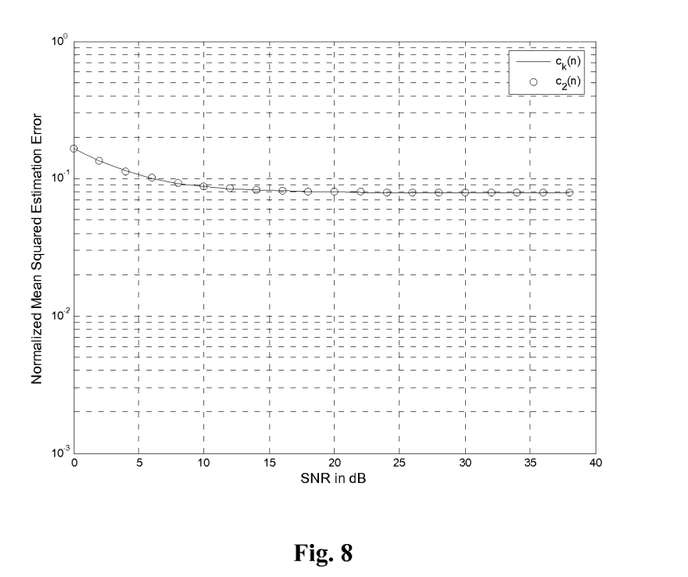
FIG. 8. illustrates MSEE vs. SNR graph showing comparison between the training sequences $c_k(m)$ and $b_k(n)$. Here $N=512$, $Q=8$, $T_p=2$, and the exponential power delay profile used was $e^{-l}$, $l=\{0, 1, \ldots Q-1\}$ FIG. 9. illustrates BER vs. SNR graph showing comparison between the training sequences $c_k(m)$ and $b_k(n)$. Here $N=512$, $Q=8$, $T_p=2$, and the exponential power delay profile used was $e^{-l}$, $l=\{0, 1, \ldots Q-1\}$ FIG. 10. illustrates a comparison of the magnitude spectrum of $c_k(m)$ and $p_k(n)$. $p_k(n)$ loses its spectral flatness because of appending an additional −1 to the m-length PN sequence having a period of N−1.
Figure 9:
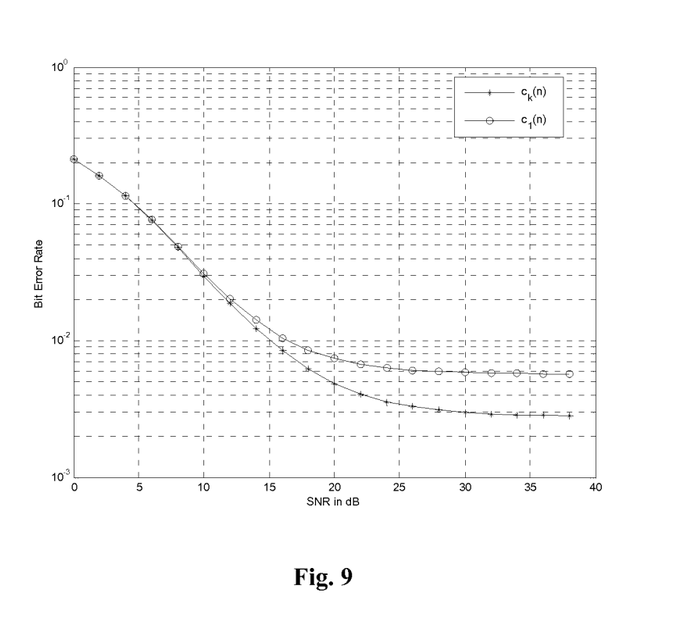

2) Performance comparison: In this simulation, a block frequency selective fading channel model with Q=8 and $T_p$=4 (definitions as in Table 1), is used to compare the performance of the training sequences $c_k(m)$ in (2) and $$b_k(m) = b_k(m+Q) = e^{j\frac{2\pi m}{Q}(\frac{m}{2}+1)}$$

proposed in the prior art. Each channel realization is drawn from a zero mean complex Gaussian process with the variance in each path normalized to follow an exponentially decaying power delay profile. The MSEE and BER were averaged over 500 Monte Carlo iterations. As discussed earlier, the MSEE of these two sequences as seen in FIG. 8 are the same but the BER performance with $c_k(m)$ is better in the high SNR regime as observed in FIG. 9. Hence $c_k(m)$ is the optimal training sequence in terms of jointly minimizing the BER and the MSEE for OFDM systems employing superimposed training because it ensures a fair distribution of the interference due to the training on the data on all the subcarriers.

3) Comparison of the digitized LFM sequence with a PN sequence.

Figure 10:
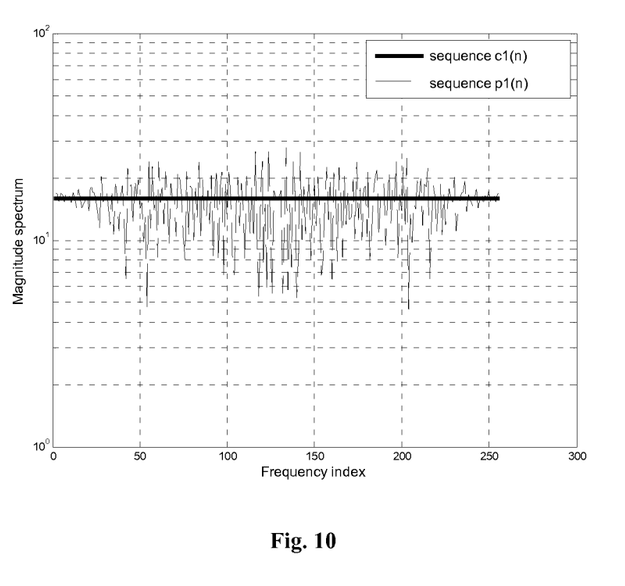

The performance of the proposed training sequence $c_k(m)$ with a PN sequence which is commonly used as a training sequence for channel estimation in single carrier systems is compared. The PN sequence is periodic with period N, denoted by $p_1(m)$. This is generated by an N−1 length maximum length PN sequence and appended by −1. Each value may be multiplied by a complex scale factor. It is seen that $c_k(m)$ has a more even distribution of energy in all the subcarriers as compared to $p_1(m)$ as shown in FIG. 10, thus being more suitable for superimposed training based OFDM systems. Therefore this method provides a better fairness than the prior art in terms of residual interference in the different subcarriers.

The invention has been described in a preferred form only and many variations may be made in the invention which will still be comprised within its spirit. The invention is not limited to the details cited above. The components and method steps herein described may be replaced by its technical equivalence and yet the invention can be performed. The structure thus conceived is susceptible of numerous modifications and variations, all the details may furthermore be replaced with technical equivalence.

The invention claimed is:

1. A method for minimizing mean square estimation error (MSEE) and bit error rate jointly during channel estimation and equalization between a transmitter and a receiver of an orthogonal frequency division multiplexing (OFDM) system, said method comprising steps of:
   transmitting from said transmitter to said receiver a training sequence for channel estimation being superimposed onto the input data at specific pilot to data power ratio (PDPR);
   receiving the OFDM signals as an input, wherein said signal simultaneously contains training sequence and data signals at said receiver;
   cross-correlating said received signal up to a specific lag determined by the rms delay spread of the channel, with a specific known training sequence stored in a register, and which is also the sequence that is added to the data at the transmitter in the time domain having a prescribed pilot to data power ratio, wherein the said cross-correlated data being processed over a length of samples depending on the coherence time of the channel and processed along with the stored values of the inverse of autocorrelation values of superimposed training (ST) sequence so as to obtain a reliable least squares (LS) based channel estimate.

2. Method as claimed in claim 1, wherein said receiver being adapted to store the training sequence in a channel estimator module.

3. Method as claimed in claim 1, wherein said training sequence is periodic comprising samples of digitized linear frequency modulated (LFM) signal having equipowered and equispaced components in all the subcarriers of the OFDM symbol.

4. Method as claimed in claim 3, wherein the training sequence components in the subcarriers being multiplied by a frequency domain window function so as to satisfy the spectral mask requirements to which said OFDM system complies.

5. Method as claimed in claim 3 wherein said LFM signal has uniform energy components in all the subcarriers of the OFDM symbol.

6. Method as claimed in claim 1 further comprises steps of:
   obtaining a vector of received samples of the OFDM symbol;
   processing the cross-correlation of the said received vector with the training sequence for K lags, where K is the order of the estimator that depends on the rms delay spread of the channel between the said transmitter and said receiver;
   processing said LS based channel estimate for at least one OFDM symbol as a multiple of said cross-correlation values with the inverse of the autocorrelation values of the said training sequence which are stored in the receiver; and
   determining such LS based channel estimates for plurality of OFDM symbols and averaging the channel estimates, wherein the number of channel estimates being averaged is determined by the coherence time of the channel to obtain the channel estimate of the frequency selective fading channel.

7. A system for minimizing mean square estimation error (MSEE) and bit error rate (BER) during channel estimation and equalization of an OFDM based communication system, said system for minimizing MSEE and BER comprising:
   means for transmitting from said transmitter to said receiver a training sequence for channel estimation that is superimposed onto the data at a specific pilot to data power ratio (PDPR);
   receiver means for receiving said signal simultaneously containing training and data signals at the said receiver; and
   means for computing a time domain least squares (LS) based channel estimate at the receiver;
   wherein the said receiver means comprises means for cross-correlating said received OFDM signal to a specific lag determined by the rms delay spread of the channel, with a specific known training sequence stored in the receiver means, and which is also the sequence that is added to the data at the transmitter in the time domain having a prescribed pilot to data power ratio,
   wherein the correlated data being averaged over a length of samples determined by the coherence time of the channel and processed along with the stored values of the inverse of autocorrelation values of superimposed training (ST) sequence so as to obtain a reliable least squares based channel estimate.

8. The system as claimed in claim 7 wherein said receiver means comprises channel estimator module having a register so as to store the training sequence.

9. The system as claimed in claim 7 wherein said superimposed training sequences are samples of a digitized linear frequency modulated (LFM) signal.

10. The system as claimed in claim 7 wherein said LFM signal comprises uniform energy components in all the subcarriers of the OFDM symbol.

11. The system as claimed in claim 7 further comprises one tap equalizer adapted to reverse effects of the channel on received data.

* * * * *